United States Patent [19]

Miyasaka et al.

[11] Patent Number: 5,279,932
[45] Date of Patent: Jan. 18, 1994

[54] OPTICAL RESPONSE ELEMENT

[75] Inventors: Tsutomu Miyasaka; Makoto Shizukuishi, both of Kanagawa, Japan

[73] Assignee: Fuji Photo Film Co., Ltd., Kanagawa, Japan

[21] Appl. No.: 934,894

[22] Filed: Aug. 26, 1992

Related U.S. Application Data

[63] Continuation of Ser. No. 581,349, Sep. 12, 1990, abandoned.

[30] Foreign Application Priority Data

Sep. 13, 1989 [JP] Japan .................. 1-237893
Dec. 18, 1989 [JP] Japan .................. 1-327715

[51] Int. Cl.⁵ .................. G03C 1/72; G02F 1/1337
[52] U.S. Cl. .................. 430/495; 430/270; 430/541; 428/910; 359/36; 359/62; 359/63

[58] Field of Search .................. 430/14, 17, 270, 340, 430/374, 495, 541; 359/87, 36, 62, 63; 428/910; 350/333, 334, 339

[56] References Cited

U.S. PATENT DOCUMENTS

| | | | |
|---|---|---|---|
| 4,435,490 | 3/1984 | Lelental et al. | 430/495 |
| 4,886,717 | 12/1989 | Jinno et al. | 430/495 |
| 4,965,174 | 10/1990 | Arai et al. | 430/340 |
| 5,020,881 | 6/1991 | Matsuda | 359/87 |

*Primary Examiner*—Marion E. McCamish
*Assistant Examiner*—Kathleen Duda
*Attorney, Agent, or Firm*—Sughrue, Mion, Zinn, Macpeak & Seas

[57] ABSTRACT

An optical response element is disclosed, comprising at least a photosensitive chromoprotein and a substance capable of changing its optical characteristics on application of an electric field or through an electrochemical reaction.

10 Claims, 4 Drawing Sheets

OPTICAL RESPONSE ELEMENT

This is a continuation of application Ser. No. 07/581,349 filed Sep. 12, 1990 now abandoned.

FILED OF THE INVENTION

This invention relates to an optical response element utilizing a photosensitive chromoprotein. More particularly, it relates to an optical response element having an optical recording function, by which image information can be repeatedly recorded, displayed, and erased. The recording step involves imagewise exposure to visible light and simultaneously utilizing a hydrogen ion transporting function of the photosensitive chromoprotein and a display function of an electrochromic material which undergoes color change in response to a hydrogen ion concentration and an outer electrical signal. The present invention also relates to an optical response element which can be used for optical information recording, optical switching, etc., in which a photosensitive chromoprotein is used as an optical information receptor, the photoelectric effect of the chromoprotein being converted to optical changes on a molecular size level.

BACKGROUND OF THE INVENTION

While silver halide photographic materials are presently the most excellent means for recording optical information as image signals in terms of sensitivity and image quality, they are disadvantageous in that development processing is required and they cannot be repeatedly used for recording and erasure. Although an electrophotographic system using an electrostatic photoreceptor is capable of repeated image recording, the recording sensitivity is low, and the whole system is not suitable to be reduced in size as an image recording element. Photoelectric converting elements utilizing photoelectric charge separation of a semi-conductor, such as a CCD image sensor, are capable of detecting image information at a relatively high sensitivity, but the image quality is limited due to the large size of the picture element and, besides, the elements per se have no function of recording and maintaining an image. Further included in known optical recording systems is a system in which information is recorded by picture elements of molecular order size utilizing photochromism of organic dyestuff molecules. However, any of the so far developed photochromic recording systems has an extremely short time of information retention and poor contrast of developed image density and is, therefore, unsuitable for recording and display of a two-dimensional image.

On the other hand, a method for achieving high sensitivity recording in which image information is caught by rhodopsin, a photosensitive chromoprotein of visual pigments, as a photoreceptor on a molecular level and then displaced with a chemical change has been proposed as disclosed in U.S. Pat. Nos. 4,084,967 and 4,356,256 to D. F. O'Brien. However, a system of converting or amplifying optical information through a chemical reaction takes time for transmission of information and has low durability against repetition of recording and erasion of information.

While application of the technique of D. F. O'Brien is confined to formation of a monochromatic image, JP-A-1-116536 (the term "JP-A" as used herein means an "unexamined published Japanese patent application") discloses a means for forming a color image by combining a photosensitive chromoprotein including rhodopsin with various pH-sensitive color forming reagents. According to this technique, since the color forming reaction is reversible with respect to a pH change, the chromoprotein must be fixed in an amphiphatic medium which is impermeable to hydrogen ion and also capable of retaining an appropriate water content for manifestation of the function of the protein, such as a lipid membrane, before a developed color image can be maintained at a stable pH condition. However, such a medium including a lipid membrane generally has a finite hydrogen ion osmotic coefficient and does not exhibit perfect impermeability. This fact is also revealed by a phenomenon that a light-induced pH change caused by rhodopsin fixed in a lipid vesicle returns to the original pH value in the dark in a short time (Reference can be made, e.g., in M. P. Heyn, *FEBS Letters*, Vol. 108, p. 359 (1979)). Accordingly, it has been demanded to establish a system reversibly responding to a pH change for maintenance of an image.

None of the above-described conventional techniques provides any suggestion for an optical recording system by which stable maintenance of image information, repetition of image recording and erasure, and high quality image recording using a photoreceptor of molecular size as a picture element can be simultaneously realized.

On the other hand, image sensors which are generally employed for detecting optical information as a two-dimensional image include two-dimensional area sensors using a solid-state junction element, such as a photo diode, an MOS transistor, and a CCD image sensor. Using a solid-state junction element as a picture element, these two-dimensional area sensors have a limit in size of picture elements (several microns or greater) from the technical consideration, and the density of optical information reception is accordingly limited. In order to detect optical information at a higher density, it has been demanded to reduce the size of picture elements to a molecular order.

As a system for recording optical information by picture elements of molecular size, an optical recording system of photon mode using an organic dyestuff compound as a recording medium has been under study in the field of laser photo discs, etc. For example, optical information recording systems utilizing photoisomerization and photochromism of dyestuff compounds are disclosed in JP-A-59-122577, JP-A-62-147453, JP-A-61-117537, JP-A-64-9282, and *Chemistry and Industry*, Vol. 18, p. 193 (1978). Any of these systems provides a means for recording still information at a high density through one-dimensional scanning and is unsuitable for recording two-dimensional dynamic information as is feasible with a CCD image sensor.

A visual organ is the most advanced area sensor which can take up two-dimensional dynamic optical information via a picture element of molecular size level. In the visual organ, rhodopsin is a photosensitive chromoprotein which functions to detect optical information. Various studies for reproducing this function of rhodopsin in vitro for constructing a photo sensor have been reported. For example, O'Brien suggests converting photo behavior of the visual pigment, rhodopsin, to changes in chemical amount to thereby achieve recording with high sensitivity as disclosed in U.S. Pat. Nos. 4,084,967 and 4,356,256. Further, JP-A-1-116536 discloses a technique for displaying a color image information input by using a combination of a proton-transporting photosensitive chromoprotein, such as bacteriorhodopsin, with various pH-sensitive color forming reagents.

In any of these photo sensors, since optical information is converted to a chemical reaction amount, the reaction product is accumulated with time of light irradiation. Therefore, it is difficult to display the output and obtain reversible on-off response in accordance with changes in intensity of light.

Various photoelectric conversion systems using an oriented film of rhodopsin have been proposed as a means capable of rapidly responding to dynamic information as a photo sensor. A photovoltaic sandwich cell using a bacteriorhodopsin film is a typical example of such photoelectric conversion systems. Examples using various oriented films are shown, e.g., in K. Nagy, *Biochem. Biophys. Res. Commun.*, Vol. 85, pp. 383–390 (1978), G. Varo, *Acta Biol. Acad. Sci. Hung.*, Vol. 32, pp. 301–310 (1981), and T-Furuno, et al., *Thin Solid Films*, Vol. 160, pp. 145–151 (1988). Further, a photo sensor by which proton transportation of a bacteriorhodopsin film in water is detected by using a pH-sensitive ISFET as an electrode is disclosed in JP-A-59-197849 and JP-A-61-11158.

In the above-described conventional photo sensors, if a solid-state junction element, such as a CCD image sensor, is employed, size reduction of picture elements is difficult. Optical recording systems utilizing photochromism of organic molecules, on the other hand, have a reduced picture element size but are unsuitable for monitoring dynamic information due to low optical response speed, particularly in dark reaction for return. Further, photoelectric conversion type photo sensors using photosensitive chromoproteins such as bacteriorhodopsin are capable of rapidly detecting dynamic optical information such as a change in electric quantity corresponding to on-off switching, but are hardly capable of achieving conversion of optical information on a molecular size level due to limitation of the picture element to the size of the electrode just like a CCD image sensor.

SUMMARY OF THE INVENTION

Accordingly, an object of this invention is to provide an optical recording element using a highly photosensitive chromoprotein as a photoreceptor, by which two-dimensional image information of visible light can be recorded and maintained with high image quality.

Another object of the present invention is to provide an optical response system for taking up optical information as picture elements on a molecular size level and reversibly and rapidly converting the optical information to two-dimensional image signals.

A further object of the present invention is to provide a two-dimensional area sensor using a photosensitive chromoprotein as a photoreceptor for monitoring dynamic optical information.

A still further object of the present invention is to provide an optical response element capable of rapidly converting optical response of a photosensitive chromoprotein film to rapidly and reversibly changing image signals on a molecular size level.

The above objects of the present invention are accomplished by an optical response element comprising at least a photosensitive chromoprotein and a substance capable of changing its optical characteristics on application of an electric field or through an electrochemical reaction.

BRIEF DESCRIPTION OF THE DRAWINGS

FIGS. 1-A, 1-B and 2 each illustrates a schematic view of the optical recording element according to the present invention.

DETAILED DESCRIPTION OF THE INVENTION

In the present invention, a photosensitive chromoprotein, which is a biological substance, is used as a photoreceptor. The photosensitive chromoprotein includes living body-originated proteins and derivatives thereof which are capable of absorbing visible light and effectively converting the light energy to an electrical charge or a chemical work. The photosensitive chromoprotein can be used in various forms such as films, agglomerates (amorphous products), and dispersions. Examples of such chromoproteins are the visual pigment rhodopsin and its family (e.g., bacteriorhodopsin, halorhodopsin, phoborhodopsin, and archerhodopsin), and photosynthetic chlorophyll proteins. Among them, the most preferred is bacteriorhodopsin in view of excellent stability in vitro. Similarly to the visual pigment rhodopsin, bacteriorhodopsin is one of retinal proteins comprised of opsin (protein moiety) and the retinal (chromophore). Bacteriorhodopsin can be isolated from a plasma membrane of *Halobacterium halobium*, one of the highly halophilic bacteria, as a disc-shaped substance called a purple membrane in accordance with, e.g., the process described in D. Oesterhalt and W. Stoeckenius, *Methods Enzymology*, Vol. 31, pp. 667–678 (1974). It is known that a purple membrane comprises two-dimensional hexagonal crystal lattices of a rhodopsin trimer and a boundary lipid (about ⅓ the weight of rhodopsin) surrounding the lattices. For further detail, reference can be made in R. Henderson and P. N. T. Unwin, *Nature*, Vol. 275, pp. 28–32 (1975). Bacteriorhodopsin contains retinal, one of the vitamin A derivatives, as a chromophore. Retinal is covalently bonded to an $\epsilon$-amino group of lysine, the 216th amino acid of the protein molecular chain, to form a Schiff base which brings about a shift of absorption maximum to the longer wavelength (called opsin shift) thereby exhibiting broad visible light absorption.

Photosensitive chromoproteins of the rhodopsin series have a broad absorption in the visible region with a peak in the wavelength region of from 550 to 560 nm, and act as a proton pump for active transport of hydrogen ions upon light absorption. With respect to the proton pumping function of rhodopsin, Akira Ikegami, Tanbakushitsu, Kakusan, Koso, Vol. 34, No. 5, pp. 440–461 or A. Ikegami, et al., Springer Proc. Phys., Vol. 20, pp. 173–182 (1987) can be referred to. Studies on utilization of this pumping function for conversion of light to an optical energy in vitro, such as photoelectric conversion or conversion from light to a pH change are reported, e.g., in K. Shingh, et al., Biophysical J., Vol. 31, pp. 393–402 (1980) and K. Ihara and Y. Mukohara, FEBS Letters, Vol. 240, pp. 1480152 (1988) and references cited therein.

Bacteriorhodopsin which is preferably used in the present invention can be chemically treated so that the retinal chromophore thereof is converted to various isomers or derivatives to achieve shifts of the absorption wavelength region to the longer or shorter side. Specific examples of the isomers and derivatives of retinal are shown below.

1. all-trans-retinal (absorption maximum: 570 nm)
2. 13-cis-retinal (absorption maximum: 550 nm)
3. 3,4-dihydroretinal (absorption maximum: 593 nm)
4. 5,6-dihydroretinal (absorption maximum: 475 nm)
5. retro-γ-retinal (absorption maximum: 430 nm)

It is also possible to obtain rhodopsin derivatives having different absorption wavelength regions by changing a part of the amino acid sequence of rhodopsin by gene manipulation as described, e.g., in T-Mogi, et al., Proc. Natl. Acad. Sci., USA, Vol. 85, pp. 4148–4152 (1988). These rhodopsin derivatives having a varied absorption wavelength can also be used effectively as a photoreceptor in the present invention.

In a first embodiment of the optical response element according to the present invention, there is provided an optical response element having an optical recording function which comprises a photosensitive chromoprotein in contact with an electrochromic material capable of exhibiting chromism through an electrochemical reaction (hereinafter referred to as EC material).

In the first embodiment, the photosensitive chromoprotein is preferably used in the form of a thin film.

The photosensitive chromoprotein which can be used in the first embodiment can be used as an admixture obtained by mixing with various binder materials in the course of film formation. Examples of suitable binder materials include amphiphatic compounds, e.g., phospholipids, fatty acids, fatty acid esters, aliphatic amines, and aliphatic amides; biopolymers, e.g., collagen, albumin, cellulose, and chitins; and synthetic polymers, e.g., polyethylene oxide, polyvinyl alcohol, polyacrylamide, and polycarbonate. Phospholipids are preferably used in the present invention. The added amount of the binder material is generally 1 to 50 wt %.

The thickness of thin film of the photosensitive chromoprotein is generally from 500 Å to 100 μm, preferably from 5000 Å to 10 μm.

The EC material which can be used in combination with the photosensitive chromoprotein film is a substance whose optical absorption reversibly changes by an electrochemical reaction according to external electrical signals, such as voltage and current, namely, chromism. Included in such an EC material are various organic or inorganic materials under study chiefly for application to display devices. Examples of suitable organic EC materials are phthalocyanine and its derivatives, viologen derivatives, styryl compounds, and Prussian blue. Examples of typical inorganic EC materials are oxides or hydroxides of various transition metals. Inorganic EC materials are preferably used in the present invention.

Preferred of these EC materials are those comprised of an oxide or hydroxide of a transition metal. With a voltage applied, a proton (H+), a cation, e.g., Li+ and Na+, or an anion, e.g., OH−, of these materials undergoes oxidation-reduction within the lattice structure thereof. A change in optical absorption, that is, chromism is induced by this electrochemical reaction. For example, the following mechanism has been proposed for accounting for the coloring behavior of tungsten oxide and iridium hydroxide.

For the details of coloring and erasion mechanism of these EC materials, reference can be made, e.g., in Shoji Yamaguchi, Kogaku. Vol. 17, pp. 152–157 (1988) or M. Shizukuishi, et al., Jpn. J. Appl. Phys., Vol. 19, pp. 2121–2126 (1980) and references cited therein.

EC materials are roughly divided into cathodic EC materials which electrochemically assume a color under cathodic polarization (with a negative voltage applied) and anodic EC materials which electrochemically assume a color under anodic polarization (with a positive voltage applied). Specific but non-limiting examples of useful EC materials are shown below.

Cathodic EC Materials $WO_3$, $MoO_3$, $TiO_2$, $V_2O_5$, $Nb_2O_5$, $Au-WO_3$

Anodic EC Materials $Ir(OH)_n$, $Ni(OH)_n$, $Rh(OH)$, $Cr_2O_3$

Details of useful EC materials of transition metal oxides including the above-enumerated examples are described in W. C. Dautremon-Smith, Displays, Vol. 3, pp. 3–22 and 67–80 (1982).

EC materials which can be used in the present invention serve to display optical information received by a photosensitive chromoprotein as a two-dimensional image through electrochromism. To this effect, the EC material is preferably formed in a thin film. Formation of a thin film of the EC material can generally be carried out by vacuum evaporation, sputtering, thermal oxidation, anodic oxidation, etc. Evaporation and spin-coating methods can be effectively used for organic EC materials.

A substrate on which the film is formed preferably includes a support having satisfactory transparency, e.g., glass and conductive glass, e.g., glass having an ITO (indiumtin oxide) or $SnO_2$ conductive film. The film preferably has a thickness of from 100 to 10,000 Å, and more preferably from 1,000 to 6,000 Å.

The structure of the element according to the first embodiment will be illustrated below.

Figure 1:
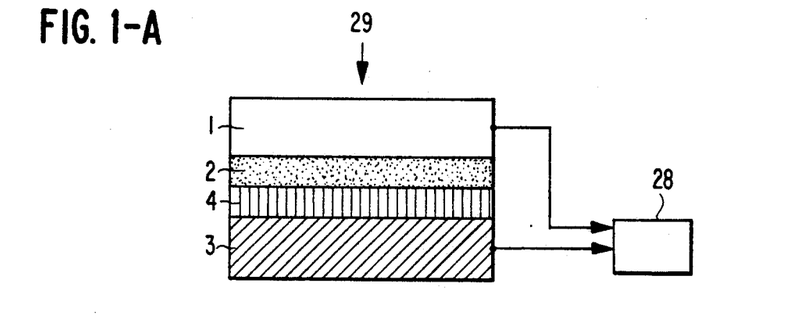

The element typically has a membranous cell structure as shown in FIG. 1-A, which comprises transparent electrode (1) having thereon thin film (2) of an EC material and counter electrode (3), with thin film (4) of a photosensitive chromoprotein being sandwiched between (2) and (3). Each of electrodes (1) and (3) is connected to a conductor wire, and the two wires are connected to an outer circuit or a bias circuit (28) via a switch to complete the circuit, and an arrow (29) indicates the incident direction of optical information.

Figure 2:
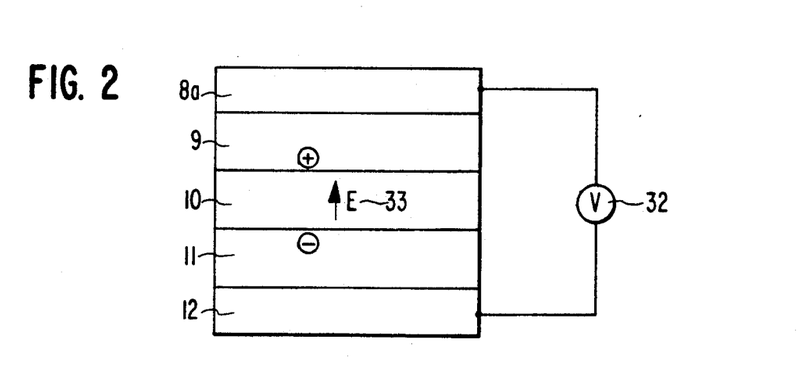

FIGS. 1-B and 2 both illustrate a membranous cell structure comprising transparent electrode (5, 8a) having thereon cathodic EC material (6, 9) and supporting electrode (7, 12) having thereon anodic EC material (8, 11), with thin film (4, 10) of a photosensitive chromoprotein being sandwiched between (6, 9) and (8, 11). Electrodes (5, 8a) and (7, 12) are connected to an outer circuit (30, 32) via a conductor wire. An arrow (31) indicates the incident direction of optical information. An arrow (33) in FIG. 2 indicates the direction of a light-induced electric field E generated in the oriented film. In this structure, since two kinds of EC materials participate in coloring of the element, that is, image formation, a higher color density can be obtained as compared with the structure of FIG. 1-A.

The transparent electrode on which the EC material is supported is preferably an electrode prepared by forming a conductive film of ITO, $SnO_2$, etc. or a metallic film of Au, Pt, Ag, Al, Cr, etc. on a glass sheet or a transparent resin sheet. The counter electrode may be transparent or opaque and, in general, a metal electrode is employed. Accordingly, a color image displayed on the EC material can be seen from the outside of the element through the transparent electrode substrate.

A means for incorporating a photosensitive chromoprotein as a thin film into the element will be described below. It is preferable that the photosensitive chromoprotein such as rhodopsin be formed into a film in such a matter that the molecules thereof are oriented planarly in one direction parallel to the thickness direction of the film. The thin film is preferably an oriented film in which the molecules of the photosensitive chromoprotein are oriented planarly in one direction parallel to the the thickness direction of the film. Being so oriented, units of the protein molecules work towards the same direction under light absorption, which brings about a marked improvement of the function.

Useful methods for forming the above-described molecularly oriented film of a photosensitive chromoprotein include a method utilizing an electric field, such as electrodeposition, as described in K. Nagy, *Biochem. Biophys. Res. Commun.*, Vol. 85, pp. 383-390 (1978), a method utilizing a magnetic field as described in D. Neugebauer, et al., *FEBS Letters*, Vol. 78, pp. 31-35 (1977), a method for forming an LB film as described in T. Furuno, et al., *Thin Solid Films*, Vol. 160, pp. 145-151 (1988), and a method utilizing adsorption characteristics onto a specific substrate surface as described in K. Singh,, et al., *Biophys. J.*, Vol. 31, pp. 393-402 (1980). A method utilizing an electric field is preferably used in the present invention.

The oriented film of a photosensitive chromoprotein thus formed on a substrate is then assembled with a counter electrode as shown in FIG. 1-A or 1-B to complete a desired element. The counter electrode is a conductive electrode with or without a thin film of an EC material being supported thereon. In FIG. 1-A, thin film (4) of a photosensitive chromoprotein is sandwiched between conductive electrode (3) and transparent conductive electrode (1) having supported thereon EC material (2). In FIG. 1-B or FIG. 2, thin film (4, 10) of a photosensitive chromoprotein is sandwiched between transparent electrode (5, 8a) having supported thereon EC material (6, 9) and electrode (7, 12) having supported thereon EC material (8, 11).

In orientation of the chromoprotein molecules, the direction of molecular orientation with respect to the adjacent EC material is an extremely important factor in manifestation of the function of the present invention.

A photosensitive chromoprotein such as bacteriorhodopsin is known to be electrically polarized upon being excited by light, and the polarization takes place as an electric field in the orientated film in the thickness direction thereof. As a result, a photovoltaic effect is observed in the outer circuit (Reference can be made, e.g., in G. Varo, *Acta Biol. Acd. Sci. Hung.*, Vol. 32, pp. 301-310 (1981)). It is preferable that the molecules of the photosensitive chromoprotein be orientated in such a direction that the photovoltaic force of the orientated film is more positive toward the electrode on the side of the cathodic EC material and more negative toward the electrode on the side of the anodic EC material. This relation can be illustrated in FIG. 2, wherein the arrow (33) indicates the direction of a light-induced electric field E generated in the oriented film.

For example, where an oriented film of rhodopsin is formed by electrodeposition, the photovoltaic force in the oriented film is produced in such a direction that the force is more negative on the side of the electrodeposited substrate electrode. In this case, it is necessary to use an anodic EC material on the substrate electrode side.

In a second embodiment according to the present invention, there is provided an optical information conversion element (photo area sensor) comprising at least an oriented film of a photosensitive chromoprotein and a layer of a substance capable of changing its optical characteristics on application of an electric field.

The photo area sensor according to the second embodiment is comprised of an oriented film of a photosensitive chromoprotein, such as bacteriorhodopsin, in which the protein molecules are orientated planarly in one direction and at least one layer of a substance capable of changing its optical characteristics on application of an electric field. These two kinds of constituting elements are preferably parallel with each other and close to each other at a distance generally within 100 μm or less, preferably within 5 μm.

Figure 7:
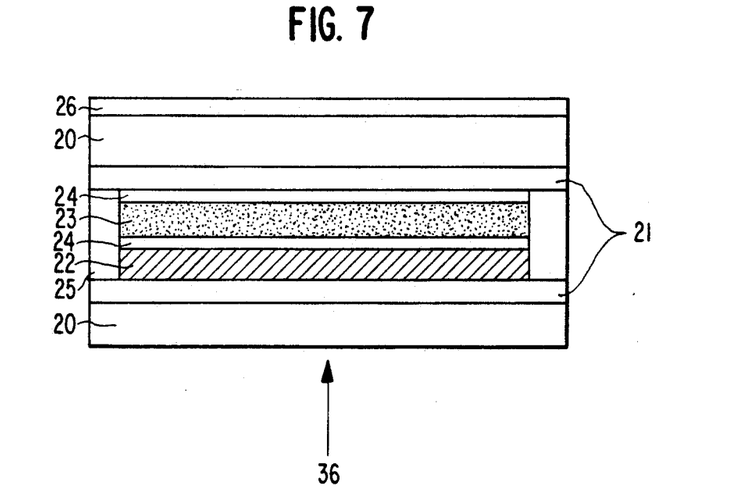
FIG. 7 illustrates a schematic view of a photo sensor containing a liquid crystal layer.

A typical basic structure of the sensor according to this embodiment is shown in FIG. 7, which comprises transparent substrate (20) having thereon a transparent conductive film electrode (21), an oriented film of a photosensitive chromoprotein (22), e.g., bacteriorhodopsin, provided on the electrode (21), and liquid crystal layer (23) formed on the chromoprotein film, with shield or polymer film (24) for liquid crystal orientation being interposed between (22) and (23). The whole element is shielded by a pair of substrates (20) and shielding material (25). An arrow (36) indicates the incident direction of an optical signal. A polarizer or a color filter (26) may provided if desired. The film electrodes (21) preferably include a transparent conductive film of ITO, $SnO_2$, etc. The film electrodes are not always necessary as essential constituting element in the present invention, and they are provided for the purpose of supplementally, applying an outer electric field to the liquid crystal layer to enhance the effects of the present invention and permit erasure. In the sensor, optical information enters from the side of the substrate having the photoconductive chromoprotein film. The photoconductive chromoprotein film preferably has an optical density of from 0.1 to 1.

The mode of detecting two-dimensional optical information by means of the sensor of the second embodiment is as follows. The optical information is absorbed by the oriented film of the photosensitive chromoprotein to excite the protein molecules whereby photo dipoles are induced in the direction of the molecular orientation and, as a result, a photoelectrostatic field is set up. The photoelectrostatic field is an electrical response to the photovoltaic force of the photosensitive chromoprotein which can be observed by using a photovoltaic cell and approximately corresponds to an electric field of from $1 \times 10^3$ to $3 \times 10^4$ V/cm. The electric field is set up perpendicular to the oriented film surface and therefore vertically traverses the layer comprising "the substance capable of changing its optical characteristics on application of an electric field" which is laminated on the protein film in parallel therewith, for example, a layer of liquid crystal molecules. As a result, the orientation of the liquid crystal molecules is electrostatically changed, which leads to a great change of optical characteristics of the liquid crystal.

Through the above-mentioned mechanism, a difference in liquid crystal molecular orientation is produced between a light-exposed area and a non-exposed area taking one molecule of the photosensitive chromoprotein as a unit picture element. Upon cutting the light, the electrostatic field disappears, and the change in orientation is immediately cancelled.

When light for monitoring enters into the sensor through a polarizing filter perpendicular to the orientation direction of the liquid crystal molecules, the plane of polarization of light passing through the liquid crystal molecules changes according as the optical information is "on" or "off", and the liquid crystal film is rapidly switched as a light valve for the monitoring light. Since the light valve is switched by the electromotive force exerted from the photosensitive chromoprotein molecules, optical switching can be achieved by picture elements of molecular size. Accuracy of readout of the two-dimensional information may be increased by enlarging the bundle of rays of the monitoring light having passed through the element and introducing it to a second area sensor.

The photosensitive chromoprotein which can be used in the second embodiment, such as rhodopsin, should have such a film structure that the molecules thereof may be orientated planarly in one direction pararell to the thickness direction of the film. Use of such an oriented film markedly improves the effects of the present invention.

Such an oriented film of the photosensitive chromoprotein can be formed by any of the film formation methods previously described with respect to the photosensitive chromoprotein oriented film to be used in the first embodiment of the present invention.

The photosensitive chromoprotein which can be used in the second embodiment can be used as an admixture with the previously described various binder materials in the course of film formation. The thickness of the oriented film of photosensitive chromoprotein in the second embodiment is generally from 500 Å to 100 μm, preferably from 5000 Å to 10 μm.

The substance capable of changing its optical characteristics on application of an electric field which can be used in this embodiment includes a liquid crystal material capable of changing its molecular orientation and optical anisotropy on application of an electric field; a compound capable of changing its absorption spectrum through a Stark effect, such as anthraquinone dyestuffs; and other substances capable of changing at least part of their optical characteristics, such as transmission, reflection, and refractive index, through an electric field effect. The most preferred of them are liquid crystals in view of their conspicuous change in optical characteristics. Examples of suitable liquid crystals include nematic liquid crystal materials, e.g., Schiff base type, biphenyl type, benzoic ester type, cyclohexylcarboxylic acid ester type, phenylcyclohexane type, pyrimidine type, dioxane type, and cyclohexylcyclohexane type compounds, and ferroelectric liquid crystals.

These liquid crystal materials may contain polychromatic dyes such as anthraquinone dyes in order to have a guest-host effect as described in JP-A-57-90079.

Where a liquid crystal film is employed in this embodiment, a transparent substrate having optical anisotropy, for example, a uniaxially oriented synthetic resin film may be used as substrates between which the liquid crystal is sandwiched (i.e., substrates (20) in FIG. 7). In this case, the substrate also serves as an optical compensator. Examples of useful synthetic resins include polyester, polycarbonate, polyether sulfone, polyether ketone, polysulfone, and polyarylate.

The present invention is now illustrated in greater detail with reference to Examples, but it should be understood that the present invention is not deemed to be limited thereto.

EXAMPLE 1

An about 5,000 Å thick transparent $WO_3$ layer was formed on a 2,000 Å thick ITO film formed on a transparent glass electrode by vacuum evaporation as follows. Pellets of $WO_3$ were placed in a tungsten crucible of an electron beam apparatus and preliminarily heated for several minutes while maintaining the degree of vacuum of the atmosphere at $5 \times 10^{-5}$ Torr. Vacuum evaporation was carried out by heating $WO_3$ for about 4 minutes at $5 \times 10^{-4}$ Torr while gradually increasing the electron beam current. During the vacuum evaporation, the temperature of the ITO substrate was varied between 30° C. and 100° C., with the rate of deposition being from 10 to 30 Å/sec.

On the thus formed $WO_3$ deposit film, an oriented film of a purple membrane was formed by an electric field orientation method as described in K. Nagy, *Biochem. Biophys. Res. Commun.*, Vol. 85, pp. 383–390 1978). That is, a purple membrane isolated and purified from a halophilic bacterium was dispersed in pure water to prepare a suspension having a maximum absorbance of 10.0/cm at a wavelength of 560 nm. A 200 μl aliquot of the suspension was evenly spread over an about 4 cm² area of the $WO_3$ deposit film. A platinum plate electrode was placed at a distance of about 0.5 mm above the suspension layer in parallel with the $WO_3$ deposit film. A grid bias of 2,000 V/cm was imposed between $WO_3$ layer and the platinum electrode using the platinum electrode as. an anode. The structure was left to stand under this condition for a long time to thereby concentrate and dry the purple membrane suspension. There was thus formed a uniformly oriented film of purple membrane having an absorbance of 0.5 on the $WO_3$ layer. Then, magnesium was deposited on the purple membrane oriented film by vacuum evaporation at $10^{-5}$ Torr via a pattern so that a magnesium deposit might not contact the lower $WO_3$ layer to form a magnesium electrode layer having a thickness of from 500 to 1,000 Å. There was thus prepared a sandwich cell having a layer structure of ITO/$WO_3$/purple membrane/Mg. If necessary, the cell was incubated in high humidity air for several hours. A conductor wire was connected to each of the ITO and Mg electrodes by ohmic joining, and the wires were connected to an outer circuit containing a direct current source via a switch to complete a circuit by which an arbitrary voltage could be applied between the ITO and Mg electrodes.

Figure 3:
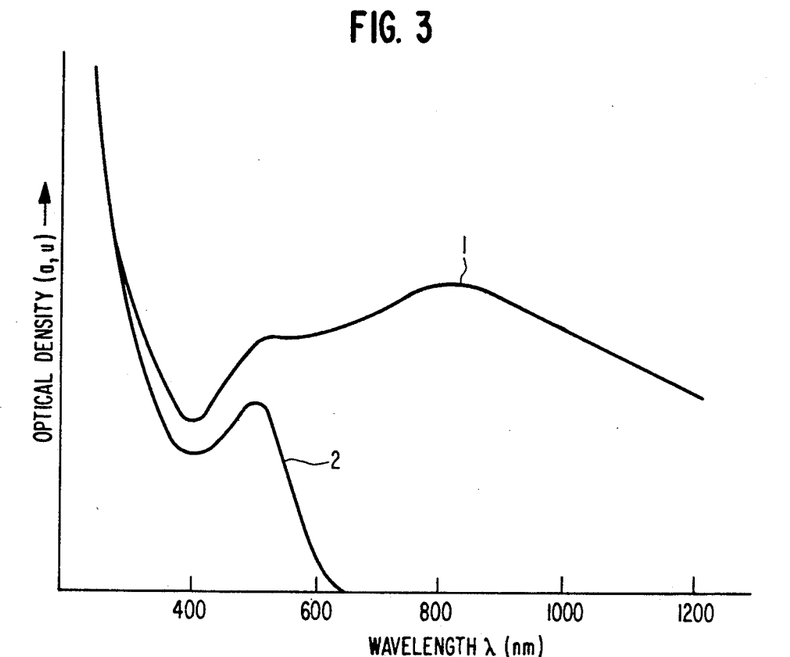
FIG. 3 is a graph showing the reflection absorption spectrum of the optical recording element on the ITO side thereof, in which numeral 1 indicates the spectrum in the "on" state, and numeral 2 indicates the spectrum in the "off" state.

An image was formed on the $WO_3$ layer by light irradiation of the purple membrane as follows. After a positive voltage (+2 V) was applied to the $WO_3$ side for initialization (color removal of the system), the voltage was shifted to negative and set within a range of from −2.0 to −2.5 V. The purple membrane film was imagewise exposed to light emitted from a 150 W xenon lamp and cut by a filter to exclude light rays of 500 nm or less through a pattern from the ITO side, whereby a deep blue image corresponding to the pattern was developed on the exposed area of the $WO_3$ layer. The reflection absorption spectrum of the resulting colored layer (on the ITO side thereof) is shown in FIG. 3. In FIG. 3, numeral 1 indicates the spectrum in the "on" state, and numeral 2 indicates the spectrum in the "off" state.

Figure 4:
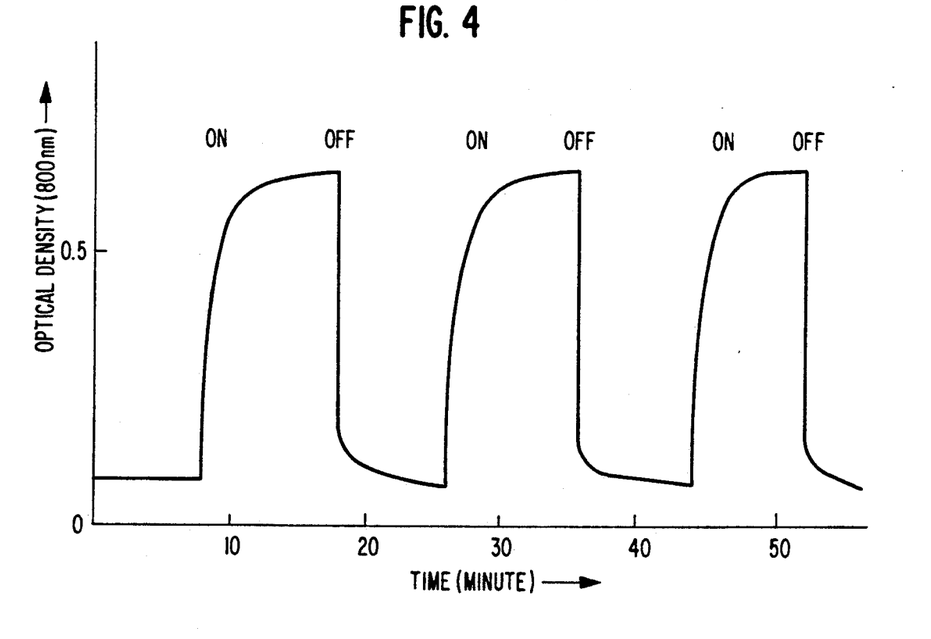
FIG. 4 is a graph showing the optical density (at 800 nm) of the optical recording element in the "on" and "off" states.

The resulting image was stably maintained even when allowed to stand at room temperature for several hours with light being turned off. Then, in order to erase the color image, a voltage of +2 V was applied to the $WO_3$ side for 6 seconds, whereupon the image completely disappeared, and the element returned to its original state. FIG. 4 shows the change in reflected color density of the element as measured from its ITO side when the above-described operation, i.e., exposure (color development) and erasion, was repeated.

EXAMPLE 2

An electrode (effective area: 4 cm$^2$) of iridium oxide (thickness: 5,000 Å), which is an anodic EC material, was prepared by the method described in S. Gottesteld, et al., *Apply. Phys. Lett.*, Vol. 33, pp. 208–210 (1978). Then, 300 μl of an aqueous dispersion (O.D.: ≦14.0) of a purple membrane isolated and purified from a halophilic bacterium was evenly spread on the electrode. The liquid layer was sandwiched by a platinum counter electrode so as to have a thickness of about 1 mm, and a voltage of from 2.5 to 3 V was applied between the two electrodes using the iridium oxide side as an anode for 60 seconds whereby a uniform oriented film of purple membrane was electrodeposited on the iridium oxide electrode. After removing adhered water, the electrodeposited film was dried at room temperature for 1 hour. The same ITO electrode having a $WO_3$ deposit layer as prepared in Example 1 was superposed thereon in such a manner that the $WO_3$ surface tightly adhered to the electrodeposited purple membrane layer, followed by lightly pressing to prepare a sandwich cell having a layer structure of $WO_3$/purple membrane/$IrO_2$ (or Ir(OH)$_n$), that is, a structure in which a photosensitive chromoprotein was sandwiched between a cathodic EC material and an anodic EC material.

A conductor wire was connected to each of the ITO/$WO_3$ electrode and the $IrO_2$ electrode by ohmic joining, and the wires were connected to an outer circuit containing a direct current source to complete a so-called complementary cell using a combination of two kinds of EC materials.

After applying a voltage of +2 V between the two electrodes with the $WO_3$ side being positive to conduct initialization, the voltage applied was shifted to negative and set within a range of from −2.0 to −2.7. Under this condition, the cell assumed a purple color arising from the purple membrane while the EC materials remaining close to colorless. When the cell was imagewise exposed to light from a xenon lamp through a pattern from the ITO substrate side, the exposed area turned to dark blue to form a distinct image corresponding to the pattern due to coloring of the both EC materials.

The image formed was stably maintained for a long time even when the light was cut off. Color erasion was completed by applying a reverse grid bias (+2 V) between the electrodes for 6 seconds. The coloring (exposure) and erasion could be repeatedly reproduced.

EXAMPLE 3

A complementary sandwich cell was prepared in the same manner as in Example 2, except for replacing iridium oxide with an anodic EC materials selected from nickel oxide, chromium oxide, and rhodium oxide. When pattern image formation was conducted by exposure to light, an image having a different hue was formed through chromism of the respective EC material.

While these optical recording elements assumed a pale bluish purple color arising from the purple membrane under color-erased condition, reduction in S/N ratio of coloring and erasion due to the background color density can be diminished by substituting the chromophore of rhodopsin by a retinal derivative having an absorption in the shorter wavelength side, e.g., 5,6-dihydroretinal and retro-α-retinal, as mentioned above.

EXAMPLE 4

An $SnO_2$/$WO_3$ electrode was prepared by vacuum evaporation of $WO_3$ on a 4,000 Å thick tin oxide layer in the same manner as described in Example 1. On the $WO_3$ layer of the resulting $SnO_2$/$WO_3$ substrate were built up 40 Langmuir-Blodgett (LB) films of a purple membrane as follows.

Figure 5:
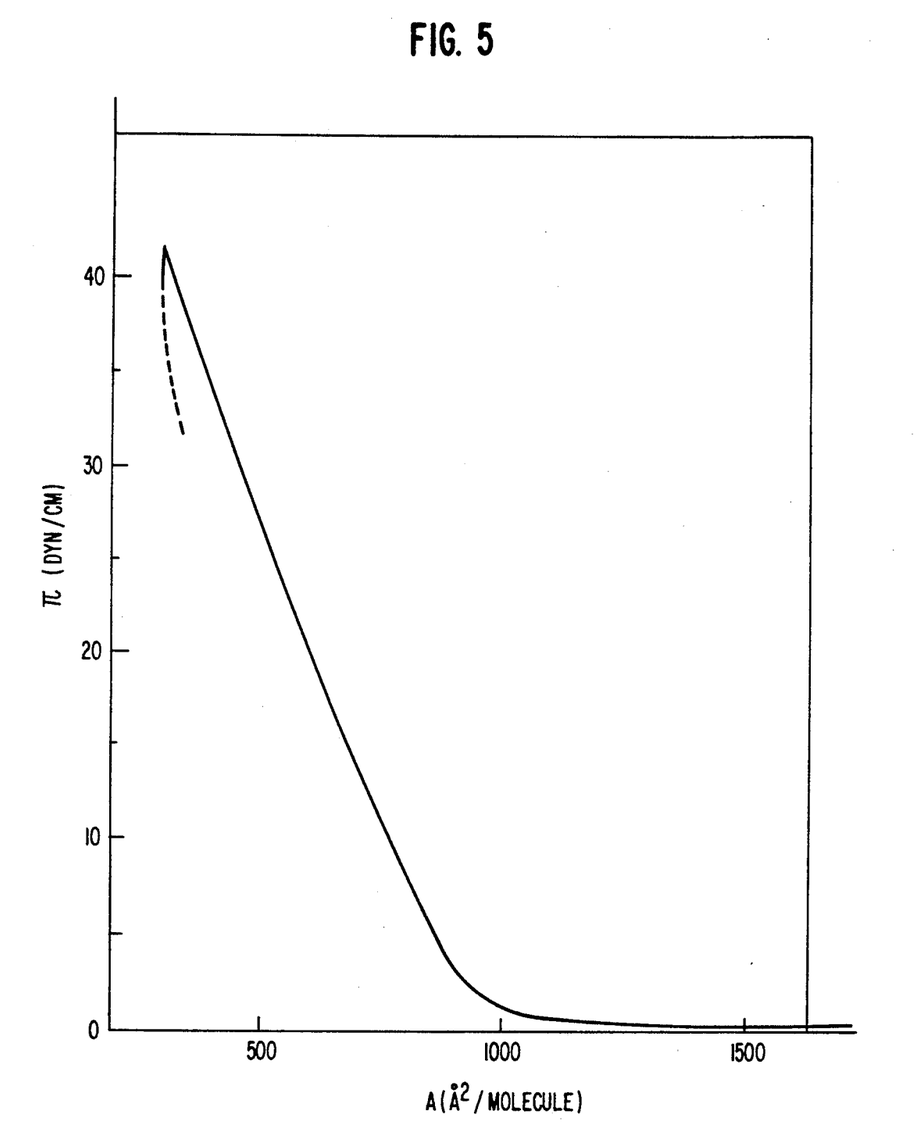
FIG. 5 is a graph showing the relationship of surface pressure vs. area of the purple membrane monomolecular film used in Example 4.

A suspension of a purple membrane in a mixed medium of water/dimethylformamide/hexane (5:2:5 by volume) (the purple membrane content corresponded to an optical density of 3.2/cm at 560 nm) was slowly dropped on the surface of an aqueous phase comprising pure water (20° C.) containing 0.5 mM of cadmium chloride whereby the purple membrane (isolated and purified from a halophilic bacterium) was spread on the water surface to prepare a monomolecular film. The surface pressure vis. area ($\pi - A$) curve as determined by taking ε of rhodopsin as 64,000 is shown in FIG. 5. After the monomolecular film of the purple membrane was condensed so as to have a surface pressure of 20 dyn/cm, it was taken up and transferred onto the $WO_3$ substrate by a water surface adhesion method such that the side of the surface of the monomolecular film to which N teminal group of the bacteriorhodopsin is oriented was joined toward the $WO_3$ substrate. This operation was repeated 40 times. During the intervals between the take-up operations, the film was sufficiently dried at room temperature. Thus, a built-up film composed of 40 layers was formed on the $WO_3$ substrate according to the method for forming X-type film as described above.

Figure 6:
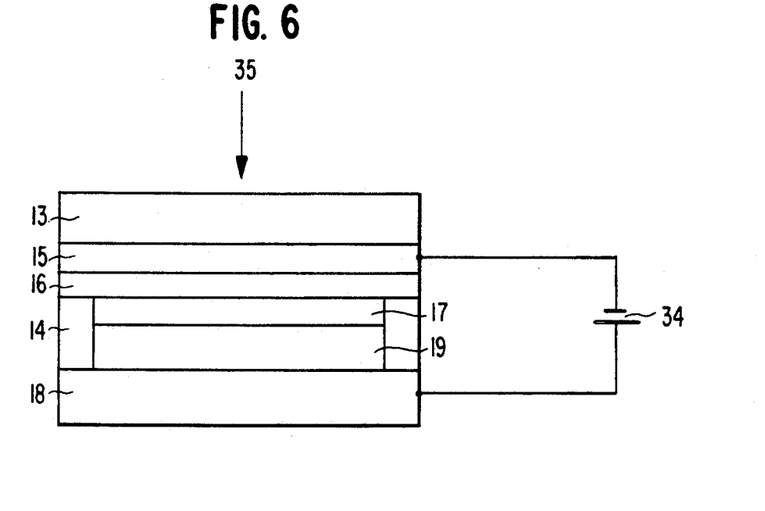
FIG. 6 illustrates a schematic view of an electrochemical cell for image formation according to the present invention as constructed in Example 4.

A gold-deposited glass plate (18) was assembled with the electrode comprising $SnO_2$/$WO_3$ (15)/(16) and transparent support (13) having a built-up purple membrane film (17) with 500 μm thick spacers (14) between the film and the gold electrode in such a manner that the built-up film and the gold deposit might face to each other, and a 50 mM aqueous solution of potassium chloride (19) was introduced as an electrolytic solution into the gap between the electrodes, and the system was sealed so that the solution does not leak. A conductor wire was connected to each of the electrodes, and the wires were connected to an outer circuit (34) to complete a sheet type electrochemical cell. The structure of the resulting cell is shown in FIG. 6. In FIG. 6, (13) indicates a transparent support and an arrow (35) indicates the incident direction of optical information.

While applying a potential of from $-1.0$ to 1.1 V to the $SnO_2/WO_3$ electrode with respect to the gold electrode, the cell was exposed to light of 500 nm emitted from a 150 W xenon lamp from the $SnO_2$ side through a pattern in the same manner as in Example 1. About 10 seconds later, a deep blue pattern image appeared on the $WO_3$ layer. The image completely disappeared on applying a potential of $+1.5$ V to the $SnO_2/WO_{33}$ electrode for 6 seconds. The image formation by exposure and erasion by positive polarization could be repeatedly reproduced.

EXAMPLE 5

A purple membrane containing bacteriorhodopsin was isolated and purified from microbial cells of *Halobacterium halobium* according to the process of Oesterhalt, et al. and dispersed in pure water to prepare a suspension having an absorbance of 10.0.

On a glass substrate having thereon a 2,000 Å thick conductive indium-tin oxide (ITO) layer was spread 50 μl of the suspension. A platinum electrode was superposed on the liquid layer in parallel with the ITO layer so that the liquid layer might have a thickness of about 1 mm, and a DC voltage of from 2.5 to 3.0 V was applied between the electrodes for 60 seconds using the ITO side as an anode to thereby form an electrodeposited oriented film of the purple membrane having a uniform thickness (absorbance: 0.5) on the ITO substrate. After removing the adhered water, the electrodeposited film was dried at room temperature for 1 hour. The surface of the electrodeposited film was then covered with a 10 μm thick resin film. An ITO substrate was separately prepared, and the surface thereof was coated with a polyimide film, followed by rubbing with cotton cloth to orient the polyimide film in one direction.

The ITO substrate having a polyimide oriented film was superposed on the above-prepared ITO substrate having an electrodeposited film in such a manner that the treated surfaces might face to each other with 8 μm thick glass fiber spacers therebetween. A Schiff base type liquid crystal compound of formula shown below was injected into the gap and sealed with an epoxy resin.

Liquid Crystal

Finally, a polarizer was superposed on the ITO substrate having an oriented film to complete an element according to the second embodiment of the present invention. FIG. 7 illustrates a schematic view of a photo sensor according to the present invention.

A DC voltage was applied between the two ITO electrodes, and light valve behavior of the liquid crystal display was determined by a back projection method. As a result, it was found that the bluish purple color of the bacteriorhodopsin background rapidly disappeared, and the liquid crystal underwent inversion under a grid bias of 4 V. Then, with a bias of 2 V applied so that the ITO electrode on the bacteriorhodopsin side became negative, band light of 550 nm was irradiated to the back of the ITO substrate on the bacteriorhodopsin side through a pattern mask using a 150 W xenon lamp and a band pass filter. As a result, a black pattern was displayed on the element screen which had only a background color of bacteriorhodopsin before light irradiation. The thus formed pattern image was rapidly erased on cutting the light, and could be repeatedly reproduced and erased by "light-on" and "light-off" operation.

The rate of response depended on the bias imposed on the ITO electrode. The higher the bias, the higher the rate of response. However, too high a bias resulted in reduction of contrast between the background color and the developed image color.

The thus formed pattern developed on the element on light irradiation could be projected as a blue projected image by passing monitoring light ($<500$ nm) of a second light source from the back of the element.

According to the optical information recording system using the optical response element of the present invention, optical information can be recorded as a planar image with high sensitivity, and the recorded image can be preserved for a long period of time. Preservation of the recorded information needs no help of an outer input such as application of an outer electric field as is required in liquid crystal display elements. The recorded information is not erased even when the element is left to stand after one light irradiation operation. Thus, the recorded image information is characterized by a high density (high picture element density) and a high contrast as a planar image. It is possible to read out the image information as two-dimensional information through an optical means. In addition, coloring and color erasion may be made use of as an optical shutter, which implies possibility to apply to an optical switch.

In the photo sensor according to the present invention, photosensitive chromoprotein molecules are excited by light irradiation to exhibit a photoelectric conversion function by which a liquid crystal display element is operated to rapidly display two-dimensional optical information as a image comprising picture elements of molecular size. The photo sensor of the invention is useful not only as a photo image sensor but also as a photospace modulating element which is an essential element of a photo computer, such as a liquid crystal light valve.

While the invention has been described in detail and wit reference to specific embodiments thereof, it will be apparent to one skilled in the art that various changes and modifications can be made therein without departing from the spirit and scope thereof.

What is claimed is:

1. An optical response element, which comprises the following consecutive layers:

a thin film photoreceptor layer comprising molecules of photosensitive chromoprotein oriented in one direction;

a polymer film layer for liquid crystal orientation;

and a thin film liquid crystal layer comprising a liquid crystal substance capable of changing its optical characteristics on application of an electric field.

2. An optical response element as in claim 1, wherein the photosensitive chromoprotein is bacteriorhodopsin.

3. An optical response element as in claim 1, wherein the thin film photoreceptor layer has a thickness direction and is an oriented film in which the molecules of the photosensitive chromoprotein are aligned in a plane, and a photovoltaic force of the molecules of said chromoprotein in said plane is generated, along the direction of the thickness of the oriented film, positive or negative towards the substance capable of changing its optical characteristics on application of an electric field.

4. An optical response element as in claim 1, which has an optical recording function.

5. An optical response element as in claim 1, which is capable of converting or processing optical information.

6. An optical response element as in claim 1, wherein said element further comprises a polarizer.

7. An optical response element as in claim 6, wherein molecules of said liquid crystal substance are oriented parallel to the molecules of said photosensitive chromoprotein, said polarizer transmitting light in a plane of polarization perpendicular to the orientation direction of the molecules of said liquid crystal substance.

8. An optical response element as claimed in claim 1, wherein said photoreceptor layer and said liquid crystal layer are less than 100 $\mu$m apart.

9. An optical response element as claimed in claim 1, wherein said photoreceptor layer has a thickness of about 500 Å to 100 $\mu$m.

10. An optical response element as claimed in claim 1, wherein said photoreceptor layer has an optical density of from 0.1 to 1.0.

* * * * *